UNITED STATES PATENT OFFICE.

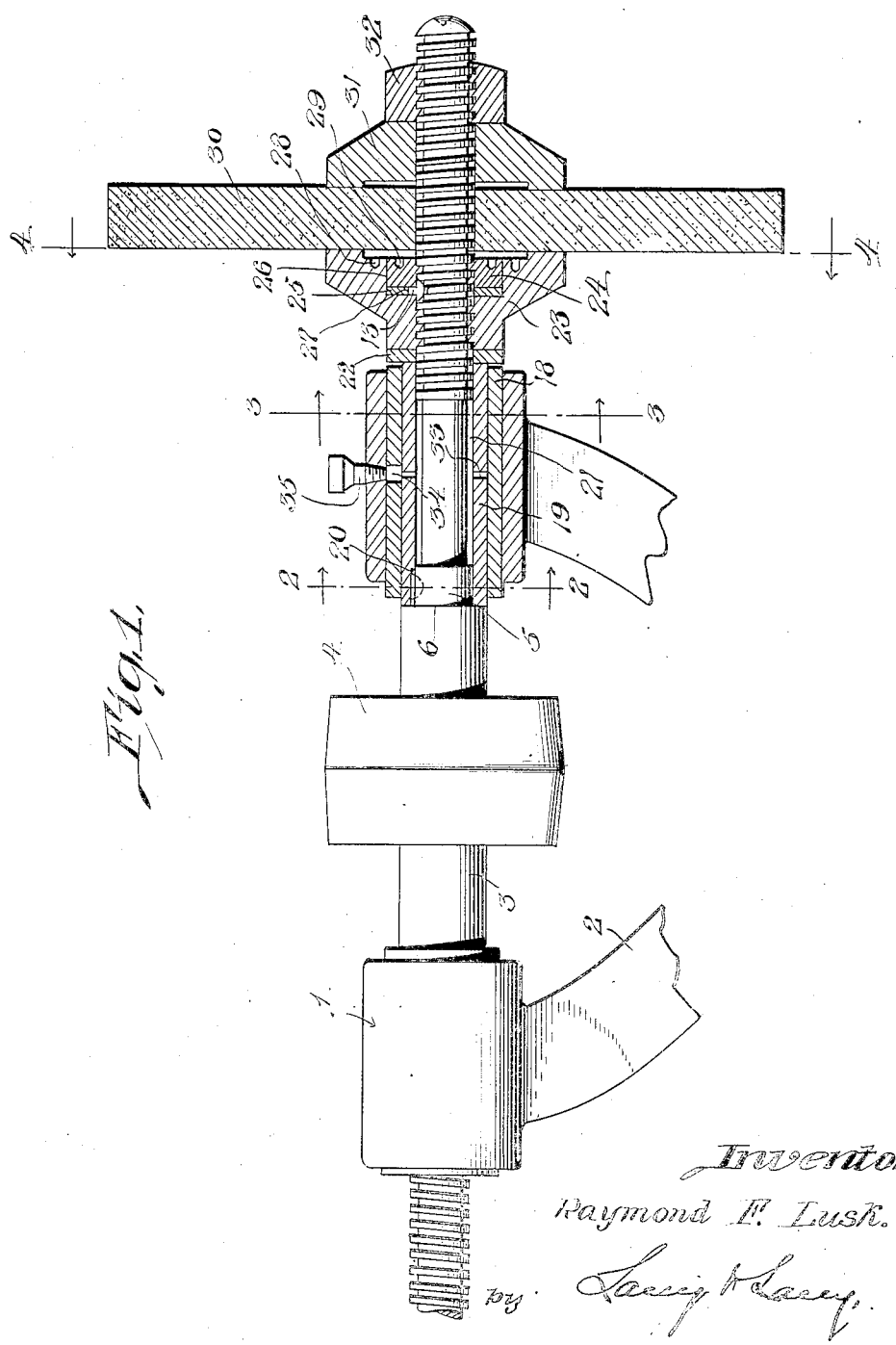

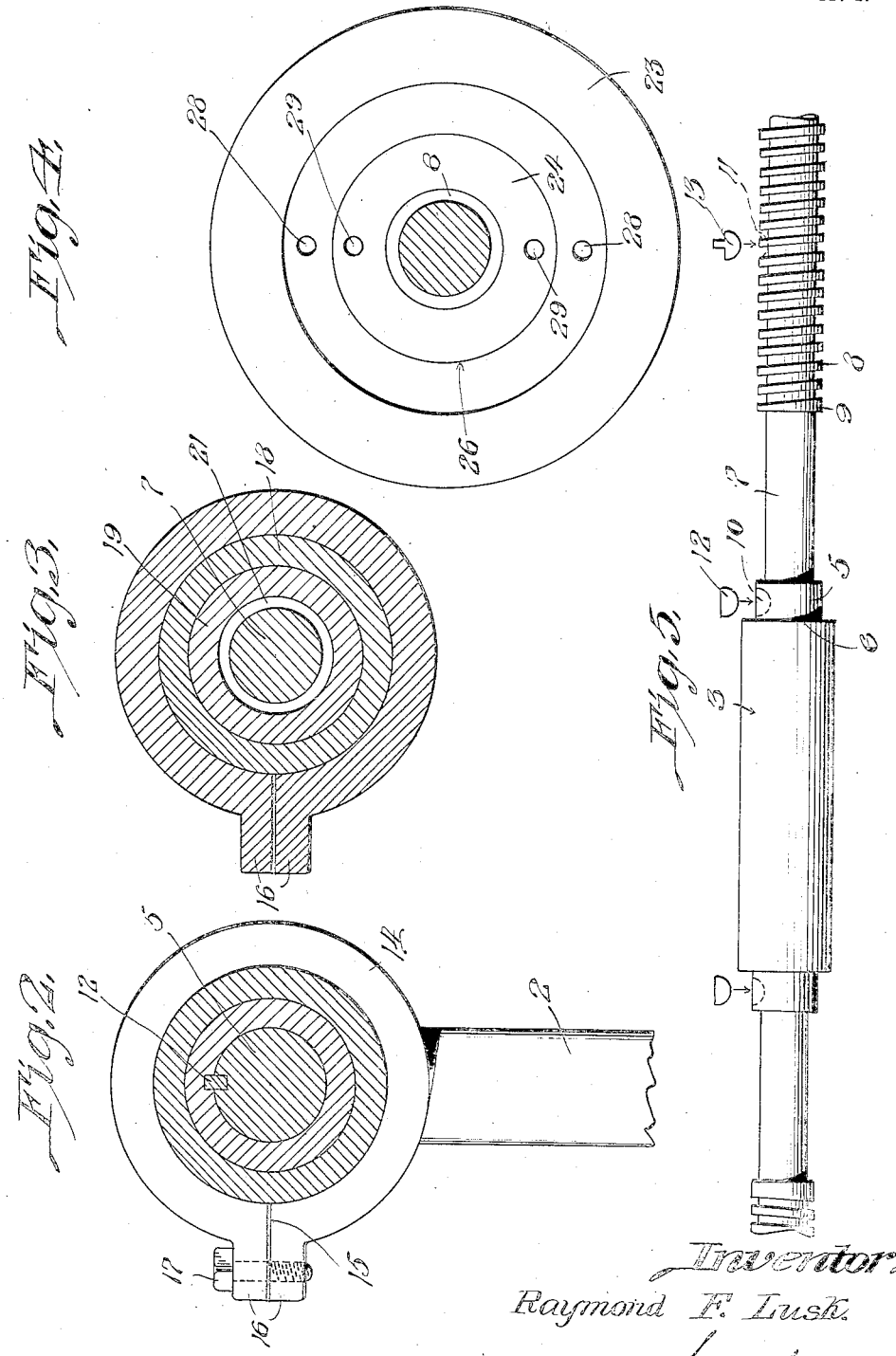

RAYMOND F. LUSK, OF LIMA, OHIO, ASSIGNOR OF ONE-HALF TO JOHN H. MONROE, OF LIMA, OHIO.

SHAFT-BEARING.

1,354,259.  Specification of Letters Patent.  Patented Sept. 28, 1920.

Application filed February 25, 1919. Serial No. 279,047.

*To all whom it may concern:*

Be it known that I, RAYMOND F. LUSK, a citizen of the United States, residing at Lima, in the county of Allen and State of Ohio, have invented certain new and useful Improvements in Shaft-Bearings, of which the following is a specification.

This invention relates to shaft bearings and has as its object to provide a bearing which will possess great advantages over the ordinary bearings provided for machine shafts. In journaling the shafts of various kinds of machines it is common to line the bearing box or head with Babbitt metal or to provide within the head a bushing in which the shaft is rotatably journaled, the babbitt lining or the bushing, as the case may be, being renewed from time to time as the parts become worn. However, a shaft so journaled will itself become worn after a time and must be renewed frequently at considerable expense. The primary object of the present invention therefore is to provide a shaft bearing so constructed that the shaft itself will be subjected to no wear whatsoever and the only parts of which bearing which are liable to become worn may be replaced at slight expense so that except because of breakage, the substitution of a new shaft will never be required.

A further object of the invention is to so construct the bearing that the parts thereof will be effectually lubricated, especially when the bearing becomes overheated.

A further object of the invention is to so construct the bearing that the parts thereof which may require renewal, may be readily removed and replaced whenever desired.

In the accompanying drawings:

Figure 1 is a view partly in elevation and partly in longitudinal section illustrating the embodiment of the invention in a grinding machine;

Fig. 2 is a vertical sectional view on the line 2—2 of Fig. 1 looking in the direction indicated by the arrow;

Fig. 3 is a similar view on the line 3—3 of Fig. 1 looking in the direction of the arrow;

Fig. 4 is a similar view on the line 4—4 of Fig. 1 looking in the direction of the arrow;

Fig. 5 is a view in elevation of a portion of the shaft to be journaled.

In the drawings the bearing and the shaft journaled thereby constitute parts of a rotary grinder although it will be understood that the principles of the invention may find embodiment in various kinds of machines.

Grinding machines of the general type illustrated in Fig. 1 of the drawings embody two bearings for the shaft upon which the grinding wheel is mounted, these bearings being indicated in general by the numeral 1 and being located at the upper ends of the arms of a yoke 2 supported by the standard of the machine, but inasmuch as the two bearings will be identical in their construction and the two ends of the shaft of the machine will be correspondingly formed, a specific description of but one of the bearings and the corresponding end of the shaft will suffice. The shaft is indicated in general by the numeral 3 and keyed or otherwise fixed upon the intermediate portion thereof between the arms 2 is the usual pulley 4 for the application of a belt whereby the shaft 3 may be driven. For a purpose which will be presently explained, the shaft 3 is formed with a cylindrical reduced portion 5 at the end of its intermediate portion upon which the pulley 4 is fixed, and the formation of this portion results in a shoulder 6. Beyond the portion 5 the shaft is further reduced as indicated by the numeral 7 and beyond the portion 7 it is formed with screw threads as indicated by the numeral 8, these threads extending, if desired, to the end of the shaft. Between the reduced portion 7 and the threaded portion 8, there may be a relatively short unthreaded portion 9 corresponding in diameter to the reduced portion 5. Also for a purpose to be presently explained the reduced portion 5 of the shaft is formed with a key seat 10 and the threaded portion 8 is formed with a key seat 11, these seats being designed to receive keys indicated respectively by the numerals 12 and 13. The arm 2 at its upper end supports an integral bearing head 14 which is split as indicated by the numeral 15 and formed at opposite sides of the split with outwardly projecting ears 16, a bolt 17 being fitted through an opening in one of these ears and threaded into the other ear. Fitted snugly within the bearing head 14 is a bushing 18 of hardened metal and after this bushing has been fitted into place, the bolt 17 is tightened so as to clamp the said bushing against rotation so that in effect it constitutes an integral part of the bearing head 14.

Fitted onto the shaft 3 is a bushing 19 which is cylindrical and exteriorly of a diameter to rotatably fit within the bushing 18. In fitting this bushing 19 onto the shaft, the key 12 is placed into the seat 10 and the projecting portion of this key will engage in a key seat 20 formed interiorly in the bushing 19 at one end thereof, this end of the bushing abutting against the shoulder 6. Interiorly the bushing 19 is of a diameter to fit the reduced portions 5 and 9 of the shaft and when the bushing is in place it, of course, surrounds the reduced portion 7 of the said shaft but is spaced therefrom so as to form a lubricant chamber 21, which will be presently more specifically referred to. The bushing 19 is of slightly greater length than the bushing 18 so that the end of the said bushing 19 remote from the shoulder 6 will project beyond the corresponding end of the said bushing 18. Fitted upon the threaded portion of the shaft is a washer 22 which engages the last mentioned end of the said bushing 19 and which is in fact caused to bear against this end of the bushing by means of a collar 23 which is threaded onto the portion 8 of the shaft and bears against the said washer. Of course, when the collar 23 is tightened upon the shaft a longitudinal thrust will be exerted against the bushing 19 firmly binding this bushing between the washer 22 and the shoulder 6 so that the bushing in effect constitutes an integral portion of the said shaft and is consequently rotatable therewith. The collar 23 is locked in place by means of a jam nut 24 threaded onto the shaft and bearing against a washer 25 which, as well as the said nut 24, is received within a recess 26 formed in the outer face of the collar. The key 13 heretofore referred to is disposed within its seat 11 prior to fitting the washer 25 into place and the said key has a portion engaging in a key seat 27 formed in the wall of the opening of the washer. Suitable sockets 28 and 29 are formed in the faces of the collar 23 and jam nut 24 for the application of a spanner wrench to these parts in adjusting them upon the shaft. The grinding wheel is indicated by the numeral 30 and is fitted onto the shaft against the outer face of the said collar 23. Another collar 31 is loosely fitted onto the threaded portion of the shaft and bears against the other face of the grinding wheel, and a jam nut 32 is threaded onto the end of the shaft and is tightened to bear against the said collar 31 so as to securely clamp the grinding wheel in place upon the shaft. As heretofore stated the space 21 comprises a lubricant chamber, and the bushing 19 is formed with one or more openings 33 which communicate at their inner ends with this chamber, the openings being so positioned that in the rotation of the bushing 19 with the shaft 3, the outer ends of the said openings will pass an opening 34 formed in the bushing 18 and through which opening 34 lubricant is supplied from a force feed grease cup 35 mounted in the upper side of the respective bearing head 14.

From the foregoing description of the invention it will be evident that the shaft itself is not subjected to any wear but that the wearing parts comprise the bushings 18 and 19. When these bushings become worn it is only necessary to remove the nut 32, collar 31, grinding wheel 30, jam nut 24, washer 25, collar 23, and washer 22 from the shaft and to loosen the bolt 17 whereupon the two bushings 18 and 19 may be slipped out of place and new bushings readily substituted therefor. As a consequence it is never necessary to replace the shaft with a new one but only necessary to supply new bushings as these are the only parts which are subjected to wear in the operation of the machine.

By adjusting the force feed grease cup 35, lubricant may be forced through the opening 34 and the openings 33 into the lubricant chamber 21 so as to more or less completely fill this chamber and lubricant will, of course, be supplied between the bushings 18 and 19 through the said openings 33. Furthermore when the bearing becomes overheated the lubricant within the chamber 21 will be caused to expand and will as a result be copiously discharged through the openings 33 so as to thoroughly lubricate the bushings and cool the bearing.

Having thus described the invention, what is claimed as new is:

1. In a shaft bearing, a bearing head, a bushing removably fixedly held in the head, a shaft provided with a shoulder and beyond the shoulder with a threaded portion, a bushing rotatably fitted within the first-mentioned bushing around the said shaft and bearing at its inner end against the shoulder upon the shaft and having its outer end extending partly over the threaded portion of the shaft, and an element threaded onto the shaft and bearing against the outer end of the last-mentioned bushing to clamp the same against the shoulder on the shaft whereby it will rotate with the shaft, the opposed faces of the bushings being parallel to the axis of the shaft and the first-mentioned bushing being shorter than the second-mentioned bushing whereby it will be out of contact with the clamping element and the shoulder on the shaft.

2. In a shaft bearing, a bearing head, a bushing removably fixedly held in the head and having an opening, a lubricant container carried by the head and arranged to discharge into the said opening, a shaft, and a bushing removably fixedly held upon the shaft and rotatably fitting within the first mentioned bushing, the shaft being reduced in its portion surrounded by the second mentioned bushing to provide a lubricant chamber and the said second mentioned bushing having an opening communicating with the said chamber and located to pass the opening in the first mentioned bushing in the rotation of the said shaft and its respective bushing.

In testimony whereof I affix my signature.

RAYMOND F. LUSK. [L. S.]